United States Patent
Dearman et al.

(10) Patent No.: US 9,720,586 B2
(45) Date of Patent: Aug. 1, 2017

(54) APPARATUS AND METHOD FOR PROVIDING FOR INTERACTION WITH CONTENT WITHIN A DIGITAL BEZEL

(75) Inventors: David Alexander Dearman, San Bruno, CA (US); Vidya Raghavan Setlur, Portola Valley, CA (US)

(73) Assignee: Nokia Technologies Oy, Espoo (FI)

( * ) Notice: Subject to any disclaimer, the term of this patent is extended or adjusted under 35 U.S.C. 154(b) by 935 days.

(21) Appl. No.: 13/590,750

(22) Filed: Aug. 21, 2012

(65) Prior Publication Data

US 2014/0055367 A1 Feb. 27, 2014

(51) Int. Cl.
*G06F 3/0488* (2013.01)
*H04W 4/02* (2009.01)
*H04W 4/20* (2009.01)

(52) U.S. Cl.
CPC .......... *G06F 3/0488* (2013.01); *H04W 4/023* (2013.01); *H04W 4/206* (2013.01)

(58) Field of Classification Search
USPC ............... 345/173–179; 178/18.01–20.04; 715/700–866
See application file for complete search history.

(56) References Cited

U.S. PATENT DOCUMENTS

| | | | |
|---|---|---|---|
| 7,012,595 B2 * | 3/2006 | Lu | 345/173 |
| 8,370,762 B2 | 2/2013 | Abbott | |
| 2006/0238517 A1 * | 10/2006 | King et al. | 345/173 |
| 2009/0058819 A1 | 3/2009 | Gioscia et al. | |
| 2009/0295753 A1 * | 12/2009 | King et al. | 345/174 |
| 2011/0164065 A1 | 7/2011 | Mate et al. | |
| 2011/0175920 A1 | 7/2011 | Ieperen | |

(Continued)

FOREIGN PATENT DOCUMENTS

| EP | 1 659 481 A2 | 5/2006 |
|---|---|---|
| EP | 2 426 580 A2 | 3/2012 |

OTHER PUBLICATIONS de Almeida, R. A. et al., *Looking Behind Bezels: French Windows for Wall* Displays, dated May 2012, [online] [retrieved Sep. 28, 2012]. Retrieved from the Internet: <URL: http://hal.archives-ouvertes.fr/docs/00/70/17/53/PDF/gridscape-avi2012.pdf, 8 pages.

(Continued)

*Primary Examiner* — Kumar Patel
*Assistant Examiner* — Amy C Onyekaba
(74) *Attorney, Agent, or Firm* — Alston & Bird LLP

(57) ABSTRACT

An apparatus, method, and computer program product are described that provide for an active digital bezel area on a display of a device. Touch input may be received in a bezel area provided on the display, where user interaction with content presented within the bezel area at a location corresponding to the location of the touch input is initially disabled. A force component of the touch input may be detected and compared to a predetermined force threshold. In cases in which the force component of the touch input exceeds the predetermined force threshold, user interaction with the content at that location may be enabled. In this way, the force exerted by the user in applying a touch input in the bezel area may be considered an indication of the user's intent to interact with corresponding content within the bezel, and such interactions may be provided for accordingly.

20 Claims, 12 Drawing Sheets

(56) References Cited

U.S. PATENT DOCUMENTS

| | | |
|---|---|---|
| 2011/0227810 A1 | 9/2011 | McKinney et al. |
| 2012/0032979 A1* | 2/2012 | Blow et al. .................. 345/647 |
| 2012/0062488 A1 | 3/2012 | Lin et al. |
| 2012/0079416 A1 | 3/2012 | Fagans |

OTHER PUBLICATIONS

Roth, V. et al., *Bezel Swipe: Conflict-Free Scrolling and Multiple Selection of Mobile Touch Screen Devices*, CHI 2009, Apr. 4-9, 2009, 4 pages.

Attention—PlayBook OS Enhancement Request, dated May 26, 2011, [online] [retrieved Sep. 28, 2012]. Retrieved from the Internet: <URL: http://supportforums.blackberry.com/t5/blackBerry-PlayBook/ATTENTION-PlayBook-OS-Enhancement-Request-REALLY-Good-Idea-IMHO/td-p/1112241>. 4 pages.

Special Report: Apple's touch-sensitive iPod ambitions disclosed in filing, dated Oct. 26, 2006, [online] [retrieved Sep. 28, 2012]. Retrieved from the Internet: <URL: http://www.appleinsider.com/articles/06/10/26/special_report_apples_touch_sensitive_ipod_ambitions_disclosed_in_filing.html. 21 pages.

International Search Report and Written Opinion for Application No. PCT/FI2013/050775, dated Oct. 9, 2013.

Office Action for U.S. Appl. No. 13/590,781 dated Oct. 27, 2014.

* cited by examiner

APPARATUS AND METHOD FOR PROVIDING FOR INTERACTION WITH CONTENT WITHIN A DIGITAL BEZEL

TECHNOLOGICAL FIELD

Embodiments of the present invention relate generally to facilitating user interaction with content presented behind a digital bezel that is provided on a user interface.

BACKGROUND

Devices for providing content to users are becoming smaller and smaller to allow greater portability and mobility to the user. As a result, the displays on such devices are also becoming smaller, and display real estate is, as such, becoming scarcer.

To facilitate the user's handling of a mobile device, such as a tablet or a cellular telephone, bezels are provided around a perimeter of the display. The bezel may be, for example, a visible rim or an edge of the display that allows the user to hold the device without inadvertently applying touch inputs to the display. The bezel may, in some cases, hold hardware buttons, house a camera, or simply provide an area that the user can hold without accidentally interacting with the displayed content. The presence of the bezel, however, diminishes the usable area of the display and, thus, further decreases the display real estate, making the viewing of certain content on the display more difficult in many cases.

Accordingly, it may be desirable to provide an improved mechanism by which content can be provided to a user via a display, while still allowing the user to handle the mobile device with ease and comfort.

BRIEF SUMMARY OF EXAMPLE EMBODIMENTS

Accordingly, embodiments of an apparatus, method, and computer program product are described that provide for an active digital bezel area on a display of a device in instances in which the bezel is determined to be needed, where the configuration of the bezel area is determined so as to enhance the user's interaction with the device display based on how the user is currently using the device. Moreover, embodiments of the present invention allow user interaction with content items that are presented within a bezel area in certain situations.

In particular, embodiments of an apparatus for providing an active digital bezel may include at least one processor and at least one memory including computer program code. The at least one memory and the computer program code may be configured to, with the processor, cause the apparatus to receive touch input in a bezel area provided on a display, wherein user interaction with content presented within the bezel area at a location corresponding to a location of the touch input is initially disabled. The at least one memory and the computer program code may be further configured to, with the processor, cause the apparatus to determine whether a force component of the touch input exceeds a predetermined force threshold and to enable user interaction with the content at the location corresponding to the location of the touch input in response to a determination that the force component of the touch input exceeds the predetermined force threshold.

In some cases, the at least one memory and the computer program code may be configured to, with the processor, cause the apparatus to enable user interaction with the content at the location corresponding to the location of the touch input by removing a portion of the bezel area corresponding to the location of the touch input. Moreover, the at least one memory and the computer program code may be configured to, with the processor, cause the apparatus to provide for a visual indication of the enablement of user interaction with the content and/or to provide for a haptic indication of the enablement of user interaction with the content.

The predetermined force threshold may vary over a duration of the touch input. The at least one memory and the computer program code may be configured to, with the processor, cause the apparatus to disable user interaction with the content at the location corresponding to the location of the touch input subsequent to enablement following execution of an operation performed as a result of user interaction with the content. Additionally or alternatively, the at least one memory and the computer program code may be configured to, with the processor, cause the apparatus to disable user interaction with the content at the location corresponding to the location of the touch input upon expiration of a predetermined amount of time following enablement of the user interaction. In such cases, the predetermined amount of time may correspond to the force component of the touch input.

In other embodiments, a method and a computer program product are described for receiving touch input in a bezel area provided on a display, wherein user interaction with content presented within the bezel area at a location corresponding to a location of the touch input is initially disabled; determining whether a force component of the touch input exceeds a predetermined force threshold; and enabling user interaction with the content at the location corresponding to the location of the touch input in response to a determination that the force component of the touch input exceeds the predetermined force threshold.

Enabling user interaction with the content at the location corresponding to the location of the touch input may, in some cases, comprise removing a portion of the bezel area corresponding to the location of the touch input. Moreover, the method and computer program product may provide for a visual indication or a haptic indication of the enablement of user interaction with the content.

In some cases, the predetermined force threshold may vary over a duration of the touch input. User interaction with the content at the location corresponding to the location of the touch input may be disabled subsequent to enablement following execution of an operation performed as a result of user interaction with the content. Additionally or alternatively, user interaction with the content at the location corresponding to the location of the touch input may be disabled upon expiration of a predetermined amount of time following enablement of the user interaction, wherein the predetermined amount of time corresponds to the force component of the touch input.

In still other embodiments, an apparatus is described for providing an active digital bezel on a display. The apparatus may include means for receiving touch input in a bezel area provided on a display, wherein user interaction with content presented within the bezel area at a location corresponding to a location of the touch input is initially disabled; means for determining whether a force component of the touch input exceeds a predetermined force threshold; and means for enabling user interaction with the content at the location corresponding to the location of the touch input in response to a determination that the force component of the touch input exceeds the predetermined force threshold.

BRIEF DESCRIPTION OF THE SEVERAL VIEWS OF THE DRAWINGS

Figure 1:
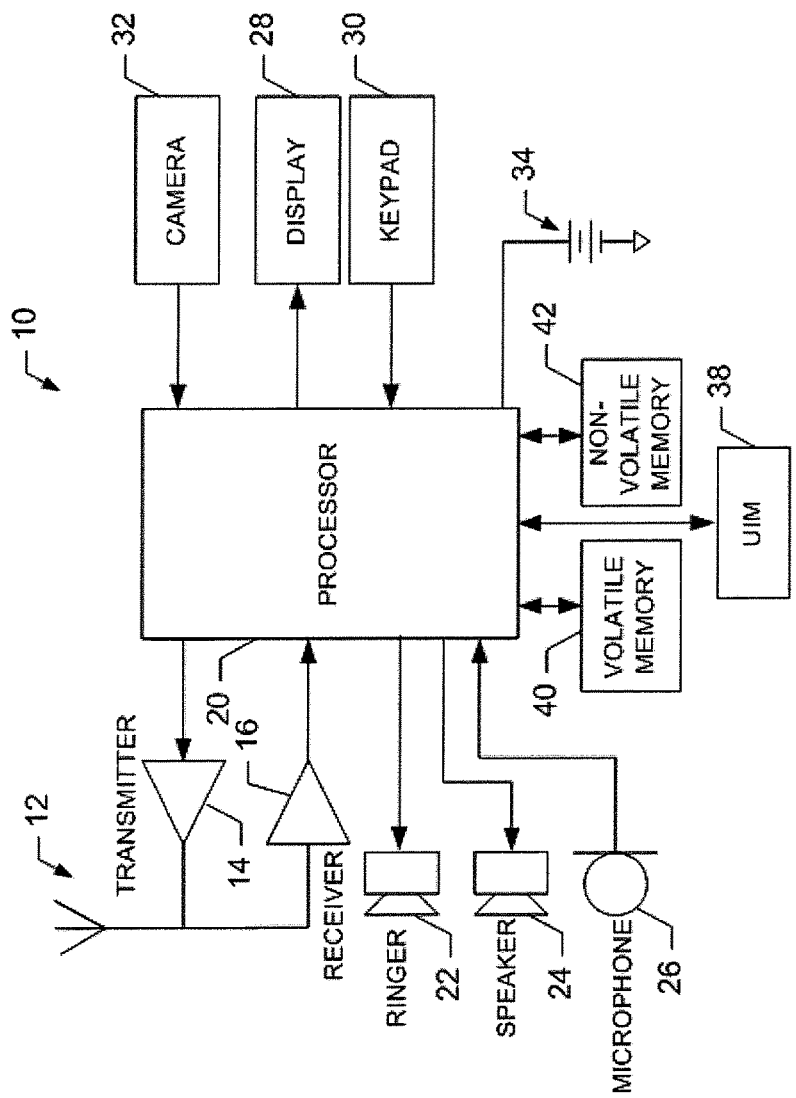
Figure 2:
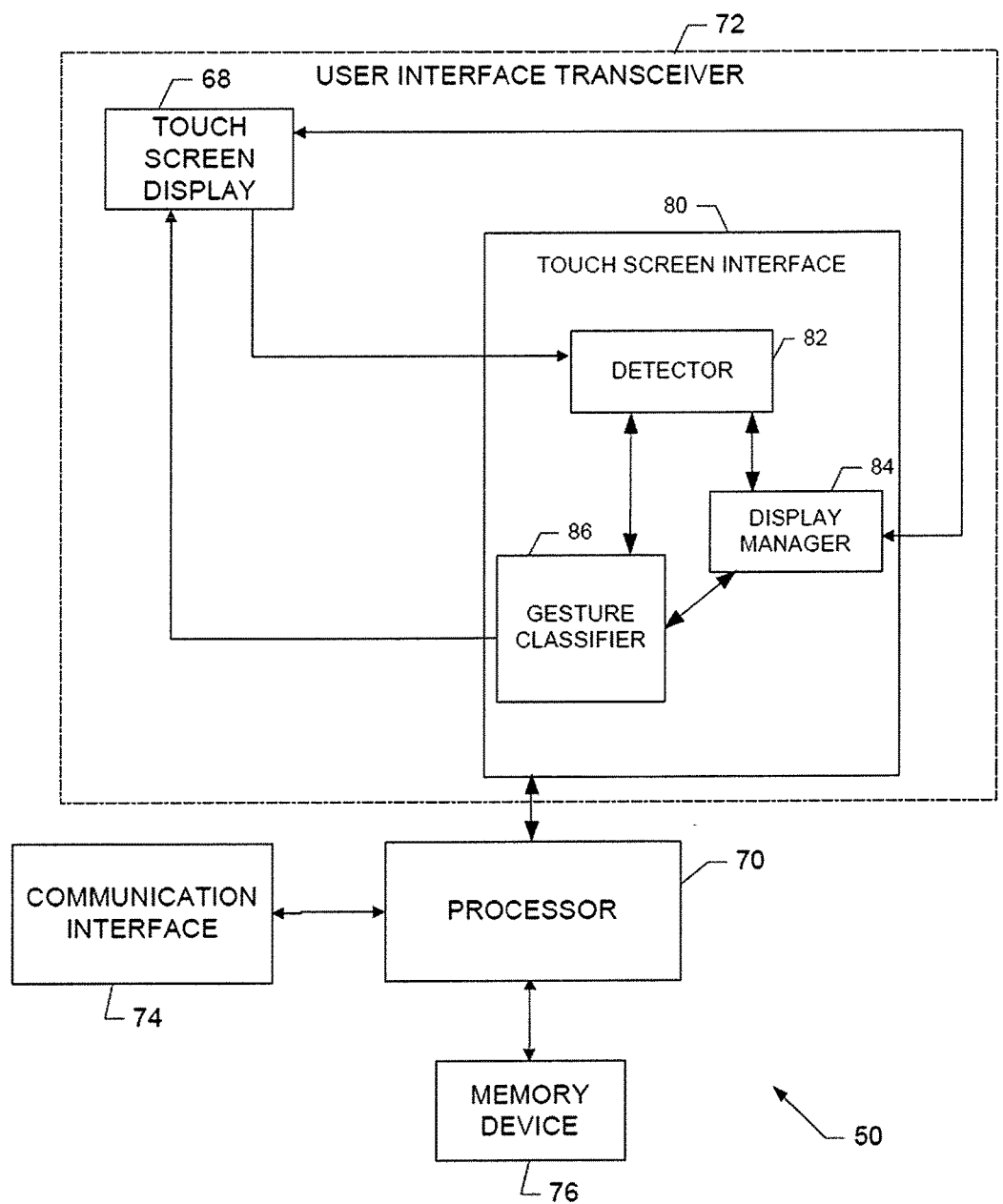
Figure 3:
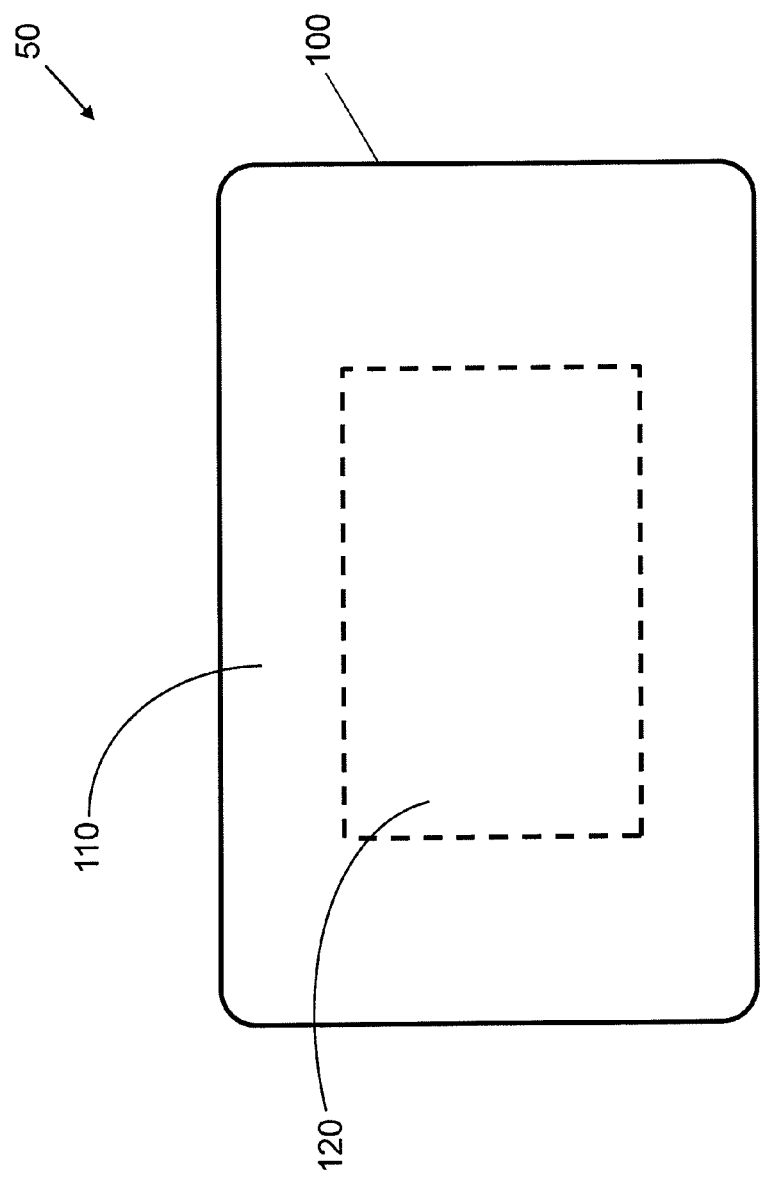
Figure 4:
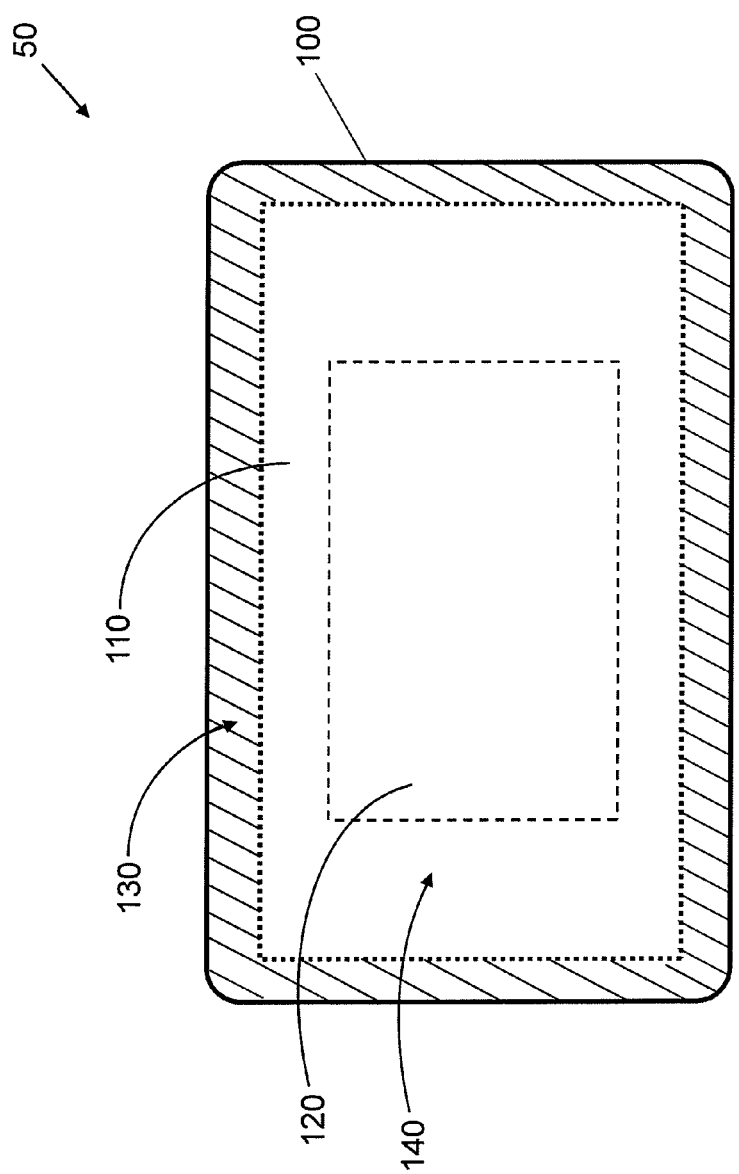
Figure 5:
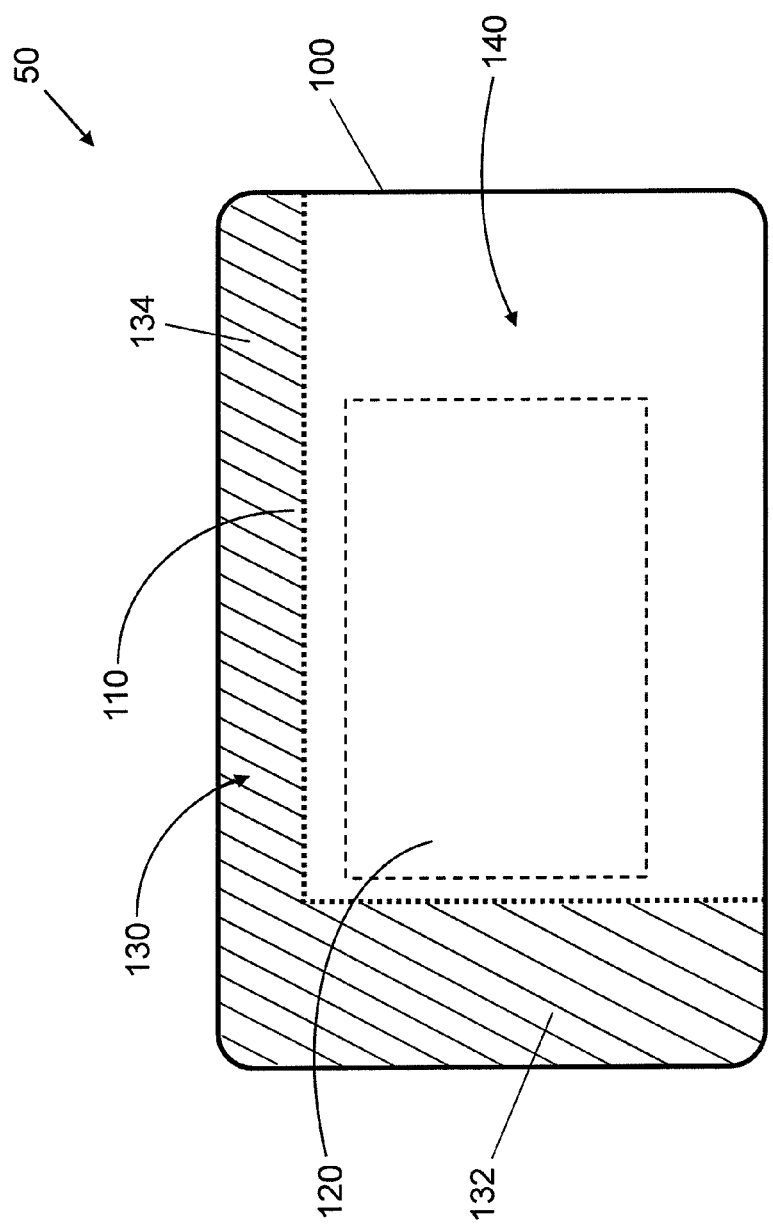
Figure 6:
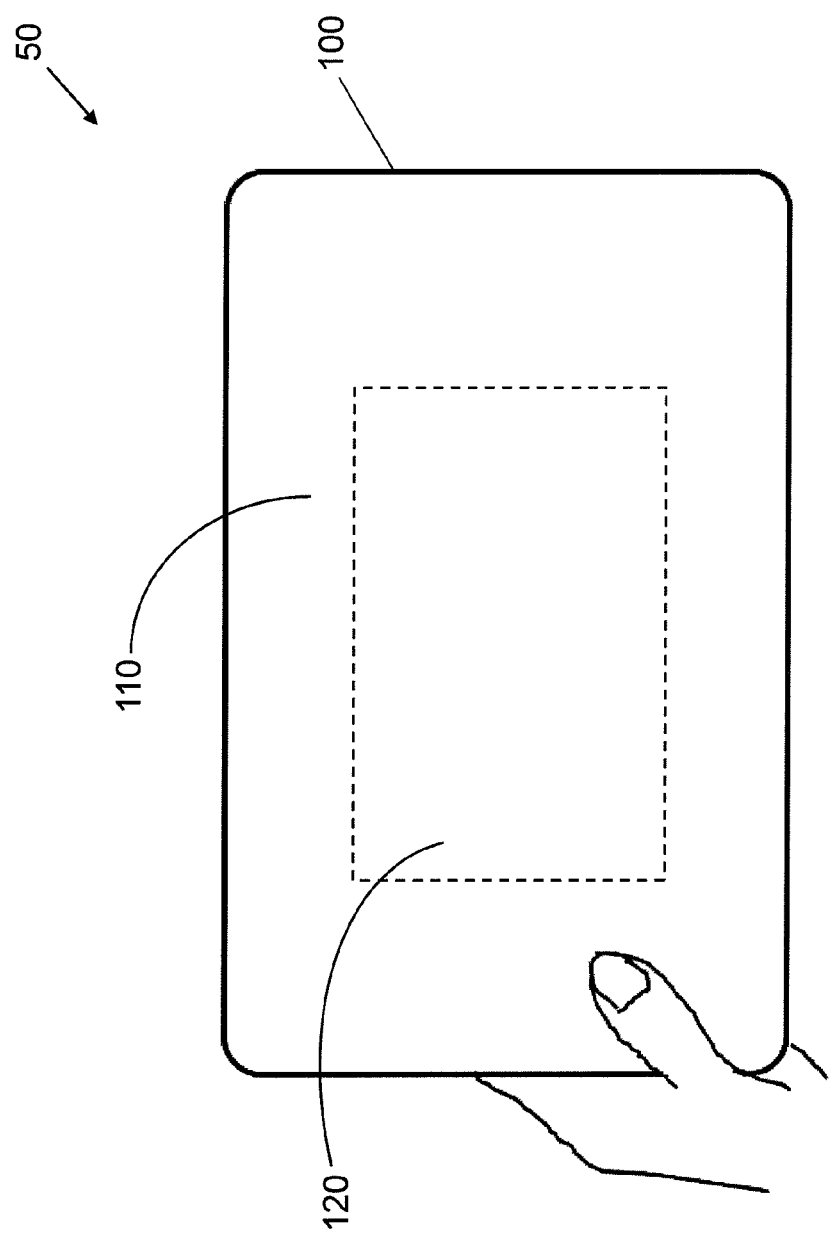
Figure 7:
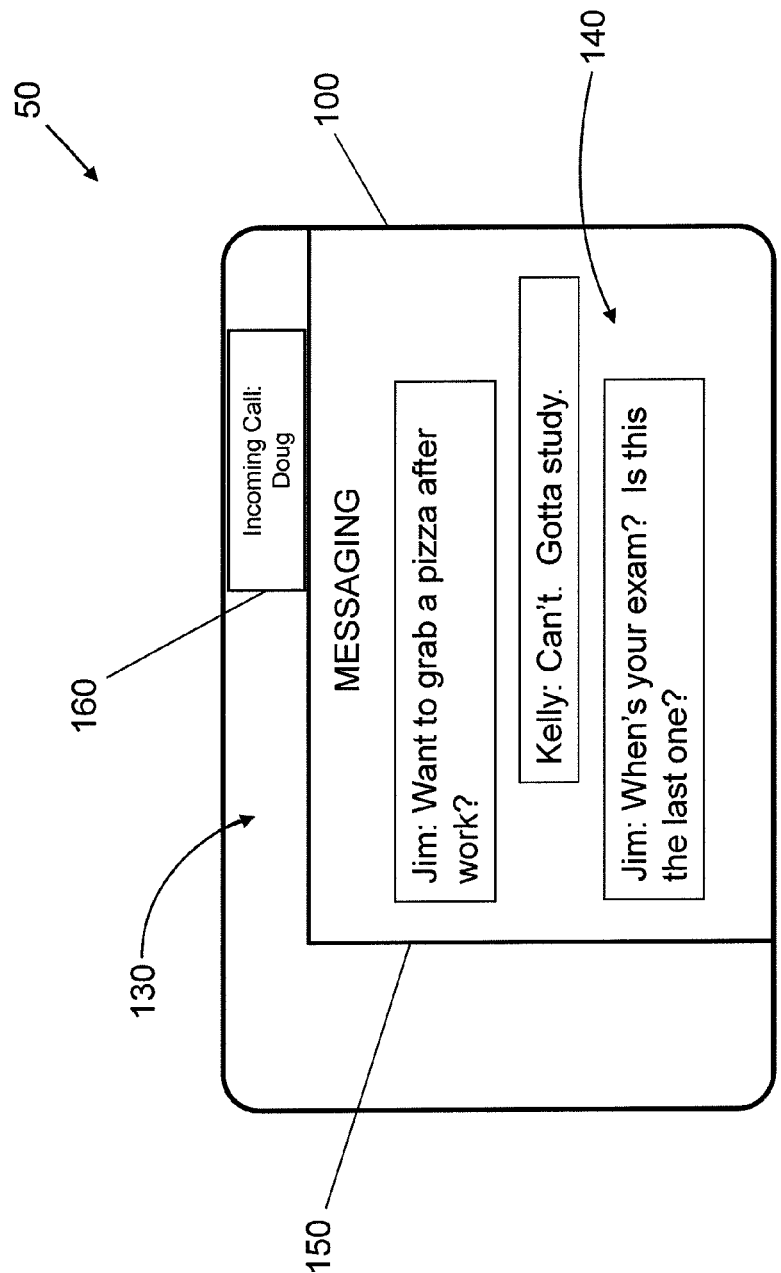
Figure 8:
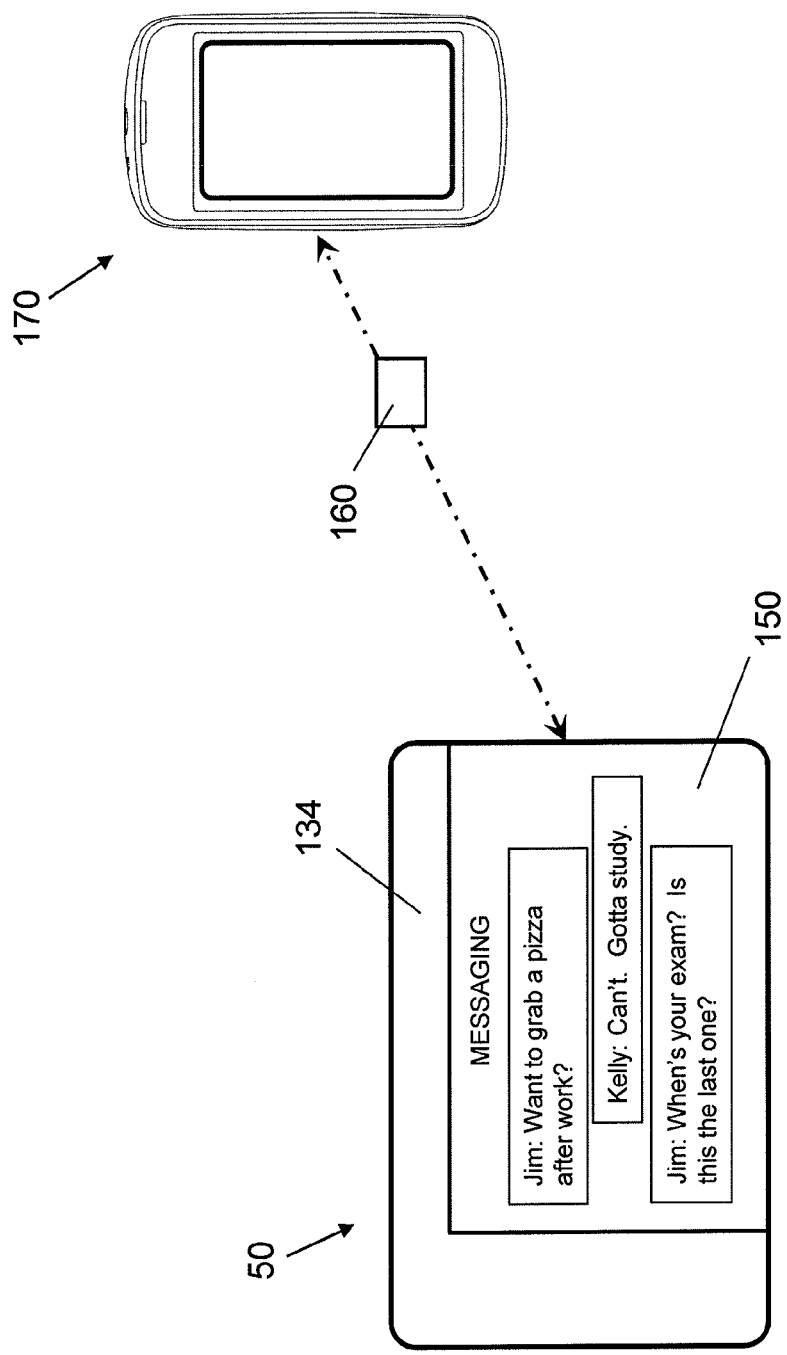
Figure 9:
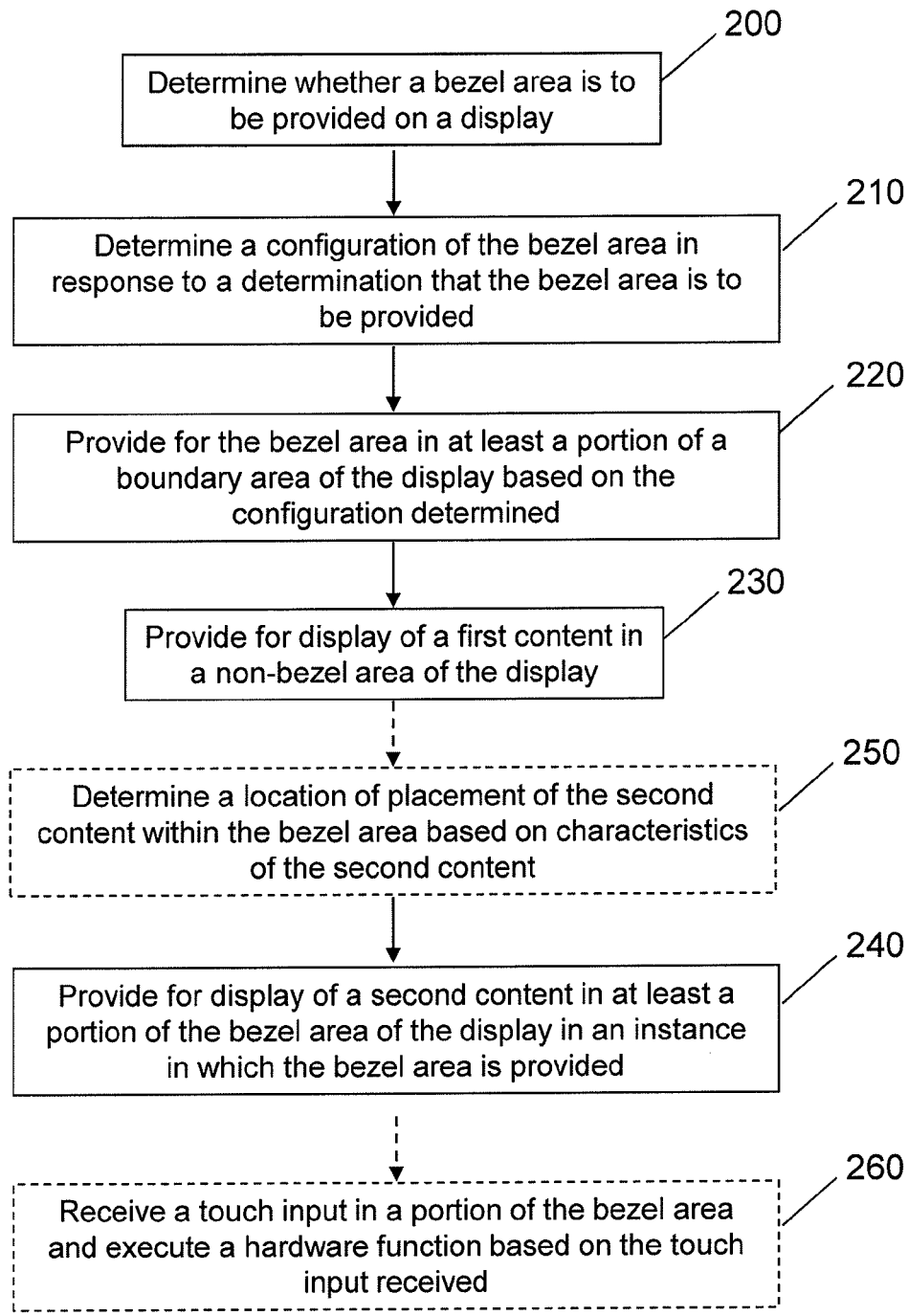
Figure 10:
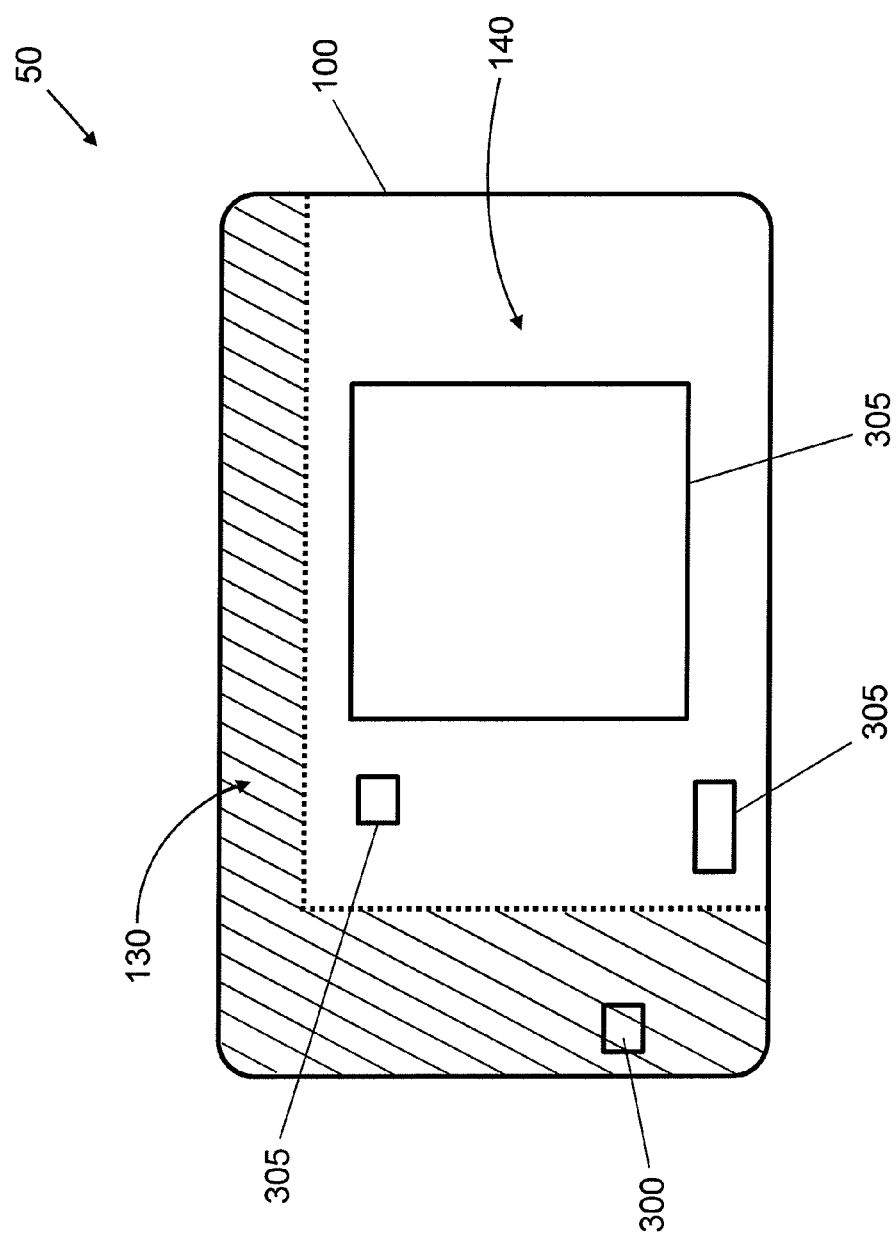
Figure 11:
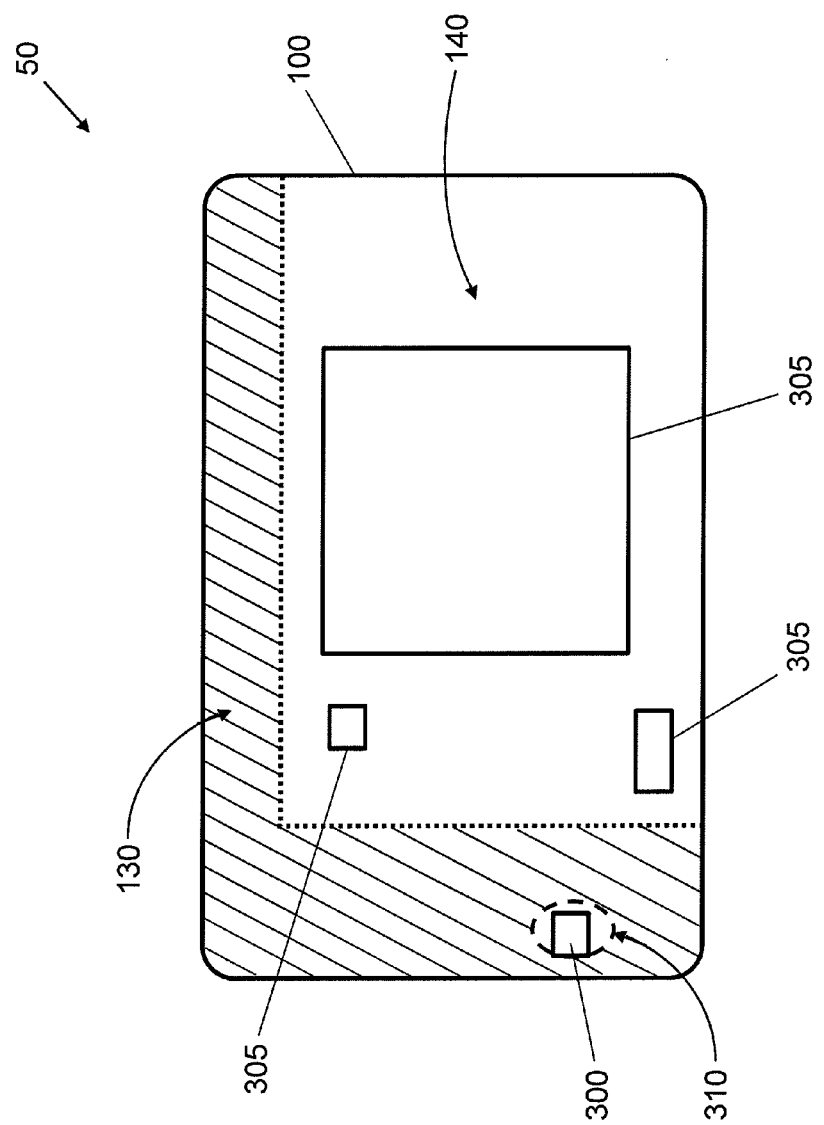
Figure 12:
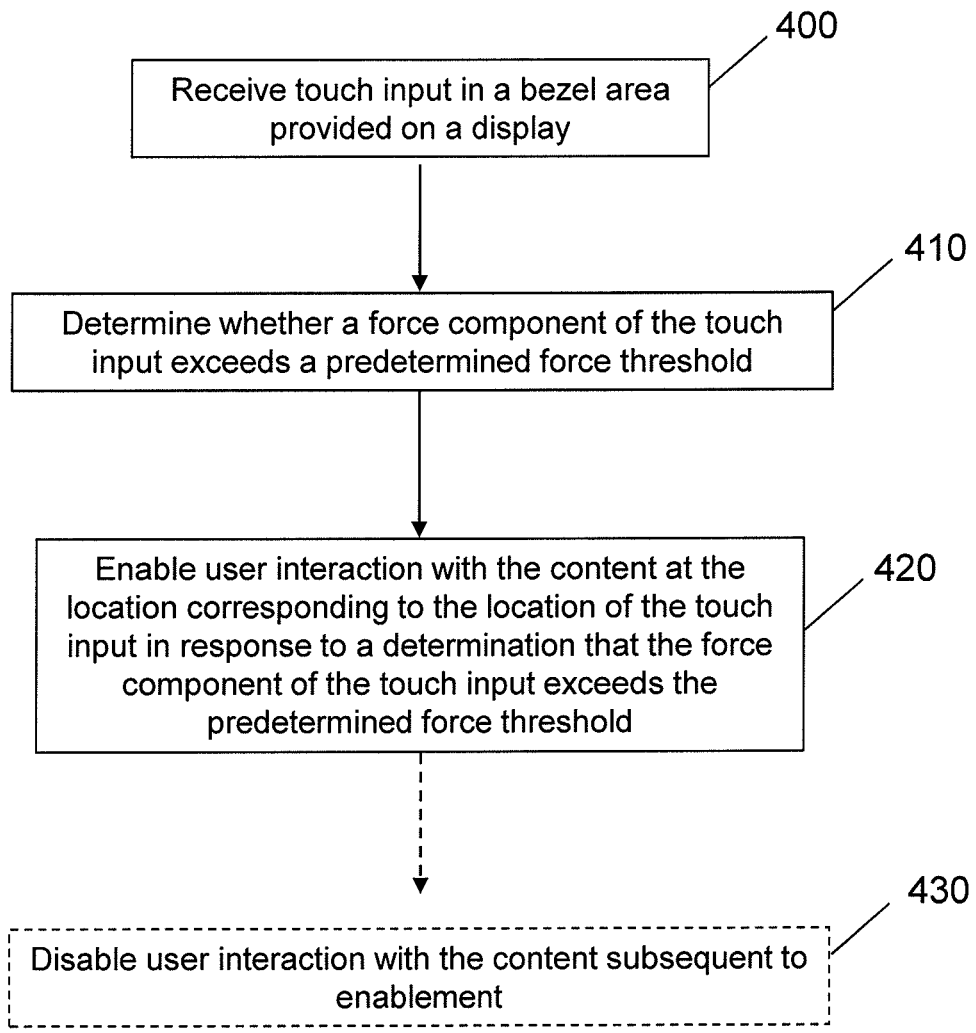

Having thus described certain embodiments of the invention in general terms, reference will now be made to the accompanying drawings, which are not necessarily drawn to scale, and wherein:

FIG. 1 illustrates one example of a mobile terminal that may be configured according to an example embodiment of the present invention;

FIG. 2 illustrates a schematic block diagram of an apparatus for providing for an active digital bezel according to an example embodiment of the present invention;

FIG. 3 illustrates an apparatus configured to provide a boundary area and a main area according to an example embodiment of the present invention;

FIG. 4 illustrates an apparatus configured to provide for a bezel area in at least a portion of the boundary area having one configuration according to an example embodiment of the present invention;

FIG. 5 illustrates an apparatus configured to provide for a bezel area in at least a portion of the boundary area having another configuration according to an example embodiment of the present invention;

FIG. 6 illustrates a user's grip on the device, resulting an obscured portion that results in the configuration of the bezel area shown in FIG. 5 according to an example embodiment of the present invention;

FIG. 7 illustrates first and second content that may be presented on the display according to an example embodiment of the present invention;

FIG. 8 illustrates an apparatus that is configured to communicate with another device nearby to receive shared data to be displayed as second content in the bezel area according to an example embodiment of the present invention;

FIG. 9 illustrates a flowchart of a method of providing for an active digital bezel according to another example embodiment of the present invention;

FIG. 10 illustrates an apparatus configured to receive touch input in a bezel area and to determine whether interaction with corresponding content within the bezel area should be enabled based on a force component of the touch input according to an example embodiment of the present invention;

FIG. 11 illustrates the apparatus of FIG. 10, where a portion of the bezel area corresponding to the location of the touch input has been removed according to an example embodiment of the present invention; and FIG. 12 illustrates a flowchart of a method of providing for an active digital bezel according to another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, the growing trend in mobile terminals is to provide devices that are smaller and more compact. Although the reduced size of these devices allows for greater portability, an unfortunate consequence of smaller devices is the diminished size of the display screens for these devices.

Modern mobile terminals have also been enhanced to support a large number of software applications and provide for a vast array of user functionality, including allowing users to enter input through direct interaction with a touch screen display. Some applications require frequent user interaction with the display, such as telephone applications that allow a user to select a contact to view or call, messaging applications that allow a user to enter text and images, or gaming applications that require a user to provide inputs for advancing the game. Other applications, however, do not require frequent input from the user. In the case of a media player, for example, the user may simply watch a movie presented on the display and may not have the need to interact with the display for long stretches of time.

Although bezels are provided around mobile terminal displays to facilitate a user's handling of the device, for example by providing a physical area for the user to hold the device without accidentally interacting with the touch screen display, the consequence of having a bezel is the existence of a "dead" zone around the display on which content cannot be displayed. Moreover, the display of notifications, alerts, widgets, or other intermittent or automatically presented information (e.g., information relating to another program that may be running in the background and with which the user may not be interacting at the moment) may further limit the user's viewing of the main content displayed, as such notifications may displace or overlay portions of the main content with which the user was interacting.

In some cases, as noted above, a bezel may not be needed. For example, when the user is simply watching a movie on his or her mobile device, the user may have the device resting on his or her lap or on a table and, in that case, may not be touching the device at all. In addition, providing the movie content to the user over as large a display surface as possible (e.g., by eliminating the "dead" zone of the bezel) may allow the user to have a more pleasant movie-viewing experience. As another example, when the device is idle, such as when the device is sitting in a dock, and a lock or idle screen is displayed showing the time (for example), a bezel may not be necessary.

Accordingly, embodiments of the present invention provide for an active digital bezel area on a display of a device, where the configuration of the bezel area is determined so as to enhance the user's interaction with the device display based on how the user is currently using the device. In some cases, for example, the digital bezel may not be provided at all, such that a user may be able to view a movie (for example) from one edge of the device to the other. In cases where a bezel is found to be necessary to facilitate the user's experience with the device, the bezel area may be provided in at least a portion of a boundary area of the display based on a specific, customized configuration of the bezel area (e.g., a configuration that is determined according to the particular content presented on the display, the user's current interaction with the display, etc.). First content may be displayed in the non-bezel area of the device (the first content being, for example, a messaging application invoked by the user), whereas second content may be displayed in at least a portion of the bezel area of the display in some cases, such as when an alert or notification is presented to the user. In this way, even when a bezel is provided, the user's experience with a particular application (e.g., the messaging application) is not obstructed or obscured by the intermittent or automatic presentation of information to the user.

In instances in which a bezel is provided and content is presented on the display within the bezel area, embodiments of the invention provide for determining whether touch input received in the location of the content (through the bezel) is indicative of the user's intent to interact with the content. According to such embodiments, touch input is received in the bezel area provided on the display. A determination is then made as to whether a force component of the touch input exceeds a predetermined force threshold. User interaction with the content, which is initially disabled due to the presence of the digital bezel, may be enabled in response to a determination that the force component of the touch input exceeds the predetermined force threshold, thereby allowing the user to, at least temporarily, interact with the content.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to encode message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, which depicts certain elements of an apparatus 50 for providing for an active digital bezel. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, the apparatus 50 may be on a fixed device such as a server or other service platform, and the content may be presented (e.g., via a server/client relationship) on a remote device such as a user terminal (e.g., the mobile terminal 10) based on processing that occurs at the fixed device.

It should also be noted that while FIG. 2 illustrates one example of a configuration of an apparatus for providing for an active digital bezel, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing for an active digital bezel may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70.

Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

A touch may be defined as a touch event that impacts a single area (without or with minimal movement on the surface of the touch screen display 68) and then is removed. As such, a touch input may include a contact component (e.g., a location of the contact with the touch surface 68), a force component (e.g., an amount of force exerted by the user in applying the touch input, such as measured by force sensors in the display 68), and a duration (e.g., a length of time from when initial contact is made with the touch surface 68 until the contact is removed and the touch input ends).

A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Turning now to FIG. 3, in general, an apparatus 50, such as an apparatus embodied by the mobile terminal 10 of FIG. 1 (e.g., a tablet), is provided that has a touch screen display 100. The touch screen display 100 includes a boundary area 110 that surrounds a main area 120. In FIG. 3, the distinction between the boundary area 110 and the main area 120 is illustrated by dashed lines to generally indicate the location of each area for explanatory purposes, only. Each of the boundary area 110 and the main area 120 may be configured to display content and receive touch inputs as described above. The boundary area 110 may be further configured to serve as a bezel area in certain situations, according to some embodiments.

As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least determine whether a bezel area is to be provided on the display and determine a configuration of the bezel area in response to a determination that the bezel area is to be provided. The apparatus 50 may further be caused to provide for the bezel area in at least a portion of the boundary area 110 of the display based on the configuration that is determined.

An example of a bezel area 130 is shown in FIG. 4 (illustrated using cross-hatching). As shown in FIG. 4, the non-bezel area 140 can thus encompass the main area 120 and at least portion of the boundary area 110. Although a particular configuration of the bezel area 130 is shown in FIG. 4 (e.g., a particular size, shape, and position of the bezel area), various different configurations may be possible based on the circumstances of the user's interaction with the display 100, the content being displayed, and other factors, which are described in greater detail below. For example, while the bezel area 130 is relatively narrow, evenly spaced, and centered with respect to the display 100 in FIG. 4, in FIG. 5 the bezel area is shifted to the left-hand side of the device, with a thicker region 132 of the bezel area located along the left edge of the device and a thinner region 134 located along the top edge of the device.

The determination of whether the bezel area 130 is to be provided on the display 100 may be made, in some embodiments, by determining whether at least a portion of the boundary area 110 is obscured. For example, the presence of a user's fingers in a portion of the boundary area 110, such as resulting from the user's grip on the device, or the presence of an object on a portion of the boundary area, such as due to the placement, for example, of another device (e.g., a mobile telephone) on a portion of the display, may be detected and interpreted as an obstruction of a portion of the boundary area, resulting in the provision of a bezel area 130. The apparatus 50 may be configured to detect such an obstruction via sensors provided in the display 100 or other components, in a manner similar to the detection or receipt of touch inputs elsewhere on the display. For example, a touch input in the boundary area 110 having a duration exceeding a predetermined amount of time, having a pressure exceeding a predetermined amount, or covering an area exceeding a predetermined area may be considered an obstruction.

In some embodiments, the apparatus 50 may be caused to determine the configuration of the bezel area at least partially based on a size and/or location of the obscured portion of the boundary area 110. For example, a user's grip on an edge of the device, as shown in FIG. 6, may result in the provision of a bezel area 130 having a configuration as shown in FIG. 5.

Referring now to FIG. 7, the at least one memory and the computer program code may be further configured to, with the processor, cause the apparatus 50 to provide for display of a first content 150 in the non-bezel area 140 of the display 100 and to provide for display of a second content 160 in at least a portion of the bezel area 130 of the display in an instance in which the bezel area is provided. The first content 150 may be, for example, an active application that the user has invoked and with which the user is currently interacting. For example, in a case where the user has opened a messaging application and is in the process of drafting a text message to a contact, the messaging application content may be the first content 150 that is displayed in the non-bezel area 140.

At the same time, the user may have other applications running in the background, such as a calendar application or a telephone application. The background applications may be pre-set to provide information to the user under certain conditions, such as to provide a reminder to the user fifteen minutes prior to an appointment (via a calendar application) or to notify the user of an incoming call (via a telephone application). Such information may be transient in some cases (appearing only for a few seconds, for example), or may be displayed until certain acknowledging input is received from the user or the condition for displaying the information goes away (e.g., the incoming call is missed). Regardless, such information may form the second content 160, which may be displayed in the bezel area 130 of the display 100, so as to allow for continued viewing of the first content in the non-bezel area 140 as described above.

In some cases, however, the second content 160 may be related to the first content 150, such as information generated by the same application responsible for causing the first content. As an example, the user may be viewing a movie in the non-bezel area 140 while holding the device as depicted in FIG. 6 and may want to turn up the volume. Receipt of a touch input via the display 100 may cause a window to appear in the bezel area 130 that includes certain soft buttons for control of the movie (such as fast forward, pause, rewind, and volume controls). Such a control window may thus be the second content 160 in this example and, rather than obstructing the user's view of the movie, may be presented in the bezel area 130 of the display 100 according to embodiments of the present invention, as shown in FIG. 7.

In some embodiments, the determination of whether the bezel area 130 is to be provided on the display 100 may be made based on characteristics of the first content 150. Such characteristics may include, for example, the type of content that is displayed (e.g., the type of file), the source of the content (e.g., a website or another user in proximity to the device), the frequency or type of user interaction required for the content, the optimal display configuration for the particular content (e.g., an optimal aspect ratio or pixel dimensions for display), pre-set user preferences, etc. For example, when the first content is a movie file (e.g., having a .mov file extension), it may be determined that the bezel area 130 should not be provided, whereas when the first content is a website, it may be determined that the bezel area 130 should be provided. In some cases, a determination of whether a portion of the boundary area 110 (shown, e.g., in FIG. 6) is obscured may be considered along with the characteristics of the first content 150 to determine whether the bezel area 130 is to be provided.

As noted above, when the bezel area 130 is provided, the configuration of the bezel area may be determined to provide for optimal use of the non-bezel area 140 (for viewing and interacting with the first content) and the bezel area 130 (for viewing and interacting with the second content). In this regard, the apparatus 50 may, in some embodiments, be caused to determine the configuration of the bezel area 130 at least partially based on characteristics of the second content 160. As noted above with respect to the first content, characteristics that may be considered may include, for example, the type of content that is displayed (e.g., the type of file), the source of the content (e.g., a website or another user in proximity to the device), the frequency or type of user interaction required for the content, the optimal display configuration for the particular content (e.g., an optimal aspect ratio or pixel dimensions for display), and pre-set user preferences, among others. For example, where the second content 160 is a photograph that is shared by a remote source (e.g., another device in the vicinity), the apparatus 50 may consider the dimensions of the photograph to determine an appropriate configuration of the bezel area 130.

For example, if the bezel area 130 along a top edge of the display (region 134 in FIG. 5) has a height of 80 pixels, and the shared content consists of a photo stream including photos that are 50 pixels tall, the apparatus 50 may reconfigure the bezel area 130 such that the region 134 has a new height of 100 pixels in order to display two rows of photos in the bezel area. Thus, rather than fit only one row of photos and leave 30 pixels of the region 134 of the bezel area 130 unused, the bezel area height may be increased by 20 pixels to make full use of the space.

In some cases, however, the apparatus 50 may communicate with the other device that is attempting to share content with the user's device in order to cause an adjustment of a display configuration of the second content based on the configuration of the bezel area 130. Referring to FIG. 8, for example, the apparatus 50 may communicate the configuration of the bezel area 130 to the other device 170 and may request that the second content 160 be reformatted to fit within a particular space. As a result, in the case where the height of the bezel area 130 is 80 pixels in the region in which the second content 160 is to be placed, the display configuration of the second content may be adjusted such that the photos (in this example) also have a height of 80 pixels. Thus, if the photos in this example had an original display configuration of 70 pixels by 70 pixels, the adjusted display configuration of the photos may be 80 pixels by 80 pixels to make the best use of the available bezel area 130, while maintaining the original aspect ratio.

The display configuration may, in addition to the dimensions of the second content 160 to be displayed, also include a particular view or arrangement of the information forming the second content. For example, when the second content 160 comprises calendar event information, the apparatus 50 may request that this information be provided in such a manner as to maximize use of the available bezel area 130. Thus, rather than display the events that are scheduled for the next 2 hours, which may result in very small, hard to read content being displayed, the second content 160 may instead have a display configuration corresponding to the display of a single calendar event. In other words, based on the configuration of the bezel area, the display configuration of the second content may be adjusted as appropriate to provide the best user experience.

In some cases, in order to achieve the best user experience, the apparatus 50 may need to determine whether the configuration of the bezel area 130 should be changed to correspond to the second content 160 or whether the display configuration of the second content should be changed to correspond to the configuration of the bezel area. In these cases, the apparatus 50 may consider and weigh the effects of each change. For example, the apparatus may compare the effect on the size of the non-bezel area 140 and the result on the display configuration of the first content 150 being viewed by the user if the configuration of the bezel area 130 is changed with the effect on the display configuration of the second content 160 if the display configuration of the second content is changed to match the configuration of the bezel area. Alternatively or additionally, the apparatus 50 may determine which choice (modifying the configuration of the bezel area 130 or the display configuration of the second content 160) results in the least change and may consider this choice to be the best option.

The configuration of the bezel area 130 may, in some embodiments, be determined based on other factors, in addition to or instead of based on the characteristics of the first or second content 150, 160. For example, the configuration of the bezel area 130 may be determined by taking into account the presence of other devices in the vicinity of the user's device, the type of network service available to or used by the device, and/or the user's own preferences for how the bezel area should be displayed. In some cases, the configuration of the bezel area 130 may be determined by touch events. For example, if touch inputs are detected near an edge of the device, indicating that the user is trying to hold the edge of the device for a better grip or viewing experience, the apparatus may be caused to determine that a bezel is necessary and may further determine a size/location of the bezel area 130 based on the locations at which the touch inputs are received (e.g., to ensure that the bezel area is large enough to accommodate the user's grip). In still other cases, past user behavior may inform the determination of whether a bezel should be presented and its configuration. For example, if the user views a particular application or file type in full screen mode, the apparatus may be caused to "learn" from this past behavior and may determine that the digital bezel should not be presented in future instances in which the same applications or file types are invoked.

In addition to the configuration of the bezel area 130 and/or the display configuration of the second content 160, the apparatus 50 may further be caused to determine a location of placement of the second content within the bezel area based on, for example, the characteristics of the second content. In an instance in which the second content 160 originates from a device near the user's device (e.g., shared photos), the apparatus 50 may place the second content in a location that corresponds to the physical location of the source of the second content. Thus, when the second content 160 is coming from a device in front of and to the right of the user's device, the second content may be displayed in the right-hand side of the region 134 of the bezel area 130 along the top edge of the device, thereby roughly indicating to the user of the device the location from which the second content was received.

In other examples, the second content 160 may be placed according to a more appropriately-sized region 132, 134 of the bezel area 130 (e.g., based on the preferred display configuration of the second content), or the second content 160 may be placed according to predefined rules regarding the type of the second content. For example, calendar events, telephone notifications, and shared content received from nearby devices may always be placed in a region 134 of the bezel area 130 along the top edge of the display 100, whereas widgets may be placed in another region 132 of the bezel area along a side edge of the display. As yet another example, second content 160 that is display in a transient manner (e.g., displayed for 7 seconds, then removed) may be provided in the region 134 of the bezel area 130 along the top (or bottom) edge of the display 100, whereas non-transient second content may be displayed in another region 132 of the bezel area along a side edge of the display.

In still other embodiments, the apparatus 50 may be caused to receive a touch input in a portion of the bezel area 130 and to execute a hardware function based on the touch input received. For example, a software control dashboard for various hardware functions, such as for controlling volume, taking a picture via the device's camera, taking a video, activating Bluetooth, connecting to WiFi, powering the device on or off, etc. may be displayed in a portion of the bezel area 130, and the user may be able to provide inputs to actuate the displayed controls. Other hardware functions may also include connecting to and sharing data with social networks. Thus, as noted above, the user may be allowed to perform functions (related or unrelated to the first content 150) without obstructing the user's view of the first content displayed in the non-bezel area 140.

Regardless of how it is determined that a bezel area 130 should be provided and how it should be presented (e.g., its configuration, such as its size, shape, and location), in some instances provision of the bezel area 130, although beneficial for allowing the user to grip the device, may obscure or prevent user interaction with one or more items of content that are also presented on the display. In other words, in some cases, the region of the display that is designated for presenting the bezel area may coincide with (e.g., be co-located with) items of content with which the user may want to interact. Thus, provision of the bezel area in such a region would occlude and otherwise impair the user's ability to interact with such content.

Accordingly, in some embodiments, the at least one memory and the computer program code may be further configured to, with the processor, cause the apparatus 50 to at least receive touch input in a bezel area 130 provided on a display 100, as shown in FIG. 10. Various content items 300, 305 may be provided at various locations on the display 100. As described above, user interaction with content presented within the bezel area 130, such as content item 300, at a location corresponding to a location of the touch input may initially be disabled such that the user would not be able to select, for example, the particular content item obscured by the digital bezel. The at least one memory and the computer program code may, however, be configured to, with the processor, cause the apparatus 50 to determine whether a force component of the touch input exceeds a predetermined force threshold and may enable user interaction with the content at the location corresponding to the location of the touch input in response to a determination that the force component of the touch input exceeds the predetermined force threshold.

In this regard, force sensors may be provided in the display 100 that are configured to measure the amount of force exerted by the user in applying the touch input. The measured force may be compared to a predetermined force threshold, and in instances in which the measured force is greater than the force threshold, the corresponding touch input may be considered to be an attempt by the user to interact with the content that is presented at the location corresponding to the location at which the touch input was received. In other words, the amount of force exerted by the user in applying a touch input may be considered indicative of the user's intent to interact with a certain content item in instances in which the force applied exceeds the force threshold. The force threshold may, in some cases, be pre-set by the system (e.g., the apparatus may be pre-configured with the force threshold). In other cases, the force threshold may be determined by a user, such as by the user's configuration of system settings.

The force threshold may be static, or constant, regardless of the duration of the user's touch input. Thus, a user may initiate the touch input using a certain amount of force and, if the force applied does not allow the user to interact with the desired content, indicating that the force threshold has not been met, the user may, during the same touch input, simply apply more force (e.g., by pressing down harder on the display 100) in an attempt to exceed the force threshold and "break through" the digital bezel to gain access to the content.

In other cases, however, the predetermined force threshold may vary over a duration of the touch input. For example, the predetermined force threshold may be a dynamically reducing force threshold. In this regard, upon the user's initial contact with the display, a relatively high force may be required to exceed the predetermined force threshold. As the user continues to apply the touch input, the predetermined force threshold may decrease, such that the longer the duration of the touch input, the less force is required to exceed the predetermined force threshold and enable the user's interaction with the desired content. In this way, the duration of the applied touch input may be considered an additional indication of the user's intent to interact with the particular content, such that the longer the user maintains the touch input, the less force is needed. Thus, the user would be able to "break through" the digital bezel either by applying a large amount of force over a short amount of time or by applying a more moderate amount of force over a longer amount of time via the touch input to exceed the predetermined force threshold.

In some embodiments, the at least one memory and the computer program code may be configured to, with the processor, cause the apparatus 50 to enable user interaction with the content 300 at the location corresponding to the location of the touch input by removing a portion 310 of the bezel area 130 corresponding to the location of the touch input, as shown in FIG. 11. For example, as depicted, a portion 310 of the bezel area 130 that is approximately the same size as the area over which the touch input is applied (e.g., the area of contact between the user's finger and the display 100) may be changed from being part of the bezel area 130 to being part of the non-bezel area 140 (even if the portion 310 is discontinuous from the rest of the non-bezel area, as shown). Alternatively, the portion 310 that is removed may be sized to have an area that approximates or is larger than the content item (e.g., an icon) located at the location of the touch input with which the user wishes to interact.

The apparatus 50 may further be caused to provide for an indication of the enablement of user interaction with the content, such as a visual indication and/or a haptic indication. For example, in a case in which the bezel area 130 is presented as being opaque or otherwise visually distinguishable from the non-bezel area 140, the portion 310 of the bezel area through which interaction with the content is enabled may be presented as being non-opaque, or otherwise not visually distinguishable from the non-bezel area 140. This is depicted in FIG. 11 via the absence of cross-hatching from the portion 310 of the bezel area that has been removed. Additionally or alternatively, a haptic indication, such as a brief vibration of the display 100 or associated device, may be provided upon the user's "breaking through" the digital bezel, such as when the force applied by the user's touch input exceeds the force threshold. In this way, the user may know that interaction with the particular content has been enabled, and the user may thus proceed to select or otherwise interact with the content as desired.

Once a user has succeeded in "breaking through" the digital bezel to gain access to content located within the bezel area 130, the user's ability to interact with such content may be temporary. In other words, the digital bezel may be configured to "repair" itself at some point to resume its prior functionality of preventing unintended interaction with content located within the bezel area.

In this regard, the at least one memory and the computer program code may be configured to, with the processor, cause the apparatus 50 to disable user interaction with the content at the location corresponding to the location of the touch input subsequent to enablement. For example, the apparatus may be caused to disable user interaction following execution of an operation performed as a result of user interaction with the content. Thus, with reference to FIGS. 10 and 11, after the user has selected, for example, the content item 300 (e.g., after applying a touch input having a force component that exceeds the predetermined force threshold), the user may not be able to select the content item again, as the bezel area 130 may resume its prior (e.g., pre-touch input) configuration, and interaction with content co-located with the bezel area may be disabled.

As another example, the at least one memory and the computer program code may be configured to, with the processor, cause the apparatus 50 to disable user interaction with the content at the location corresponding to the location of the touch input upon expiration of a predetermined amount of time following enablement of the user interaction. In other words, once a user has applied a touch input having a force component that exceeds the predetermined force threshold and has, thus "broken through" the digital bezel, interaction with the content at that location may be enabled only for a certain amount of time, effectively providing the user with a window of opportunity within which to interact with the content. Within that amount of time, the user may interact with the content a number of times, but upon expiration of that time, the bezel area would resume its prior configuration and would disable further interaction with the content. The predetermined amount of time may correspond to the force component of the touch input that was applied to "break through" the digital bezel in some cases. In other words, a relatively higher force component that exceeds the predetermined force threshold may provide for a longer time period within which the user is able to interact with the content, whereas a relatively lower force component (but one that still exceeds the predetermined force threshold and successfully "breaks through" the digital bezel) may provide for a shorter time period within which the user is able to interact with the content. A relatively higher force component and a relatively lower force component may be defined in various manners. In one embodiment, a relatively lower force component is a force component that equals or exceeds a first force threshold, while a relatively higher force component is a force component that equals or exceeds a second force threshold, which exceeds the first force threshold. The first force threshold of this embodiment at least equals and, in some instances, exceeds the predetermined force threshold, while the second force threshold not only exceeds the predetermined force threshold, but also exceeds the first force threshold. As such, a relatively higher force component of the touch input may be interpreted as an intent by the user to have greater interaction with the desired content, whereas a relatively lower force component of the touch input may be interpreted as an intent by the user to have lesser interaction with the desired content (e.g., requiring less time for the interaction). This may provide the user with an intuitive way to control the longevity of access to the content through the digital bezel.

Moreover, in some cases, the size of the portion 310 through which the user may have access to content may also be controlled based on the force component of the touch input applied by the user or the duration of the touch input. For example, the harder a user presses on the display 100 to apply the touch input, the larger the portion 310 may be. Similarly, the longer the user applies the touch input, the larger the portion 310 may be. Thus, in some cases, the portion 310 may "grow" as the touch input is applied, and a visual indication of that growth (e.g., via presentation of a growing portion 310 that is removed or visually distinguishable from the rest of the bezel area 130) may help the user determine how long to apply the input based on how larger the user desires the "break through" area to be. In addition, as the bezel area 130 "repairs" itself, the portion 310 representing the "break through" region may shrink. Thus, in some cases, the predetermined force threshold may be based on whether a "break through" region already exists within the bezel area 130, such that the user may not need to apply a touch input having a relatively high force component in a case where the user is attempting to "re-open" a closing "break through" area.

Regardless, in cases in which a portion 310 of the bezel area 130 was removed, as shown in FIG. 11, the portion 310 may be brought back to provide a complete bezel area 130 once more. Similarly, in cases in which the part of the bezel area 130 corresponding to the touch input is visually distinguished from other portions of the bezel area that were maintained (such as via a difference in the level of opacity) to indicate enablement of user interaction in that region of the bezel area, subsequent disablement of user interaction may likewise be indicated, such as by removing the visual indication or distinction so that the entire bezel area 130 regains its prior appearance, thereby visually indicating to the user that the digital bezel area has been repaired.

FIGS. 9 and 12 illustrate a flowchart of systems, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowcharts support combinations of means for performing the specified functions, combinations of operations for performing the specified functions, and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for providing for an active digital bezel, as shown in FIG. 9, includes determining whether a bezel area is to be provided on a display at Block 200, determining a configuration of the bezel area in response to a determination that the bezel area is to be provided at Block 210, and providing for the bezel area in at least a portion of a boundary area of the display based on the configuration determined at Block 220. Embodiments of the method may further include providing for display of a first content in a non-bezel area of the display at Block 230 and providing for display of a second content in at least a portion of the bezel area of the display in an instance in which the bezel area is provided at Block 240.

As described above, the determination of whether the bezel area is to be provided on the display may be based on characteristics of the first content. Moreover, the determination of the configuration of the bezel area may be at least partially based on characteristics of the second content. In addition or alternatively, providing for display of the second content may include adjusting a display configuration of the second content based on the configuration of the bezel area, as described through the examples provided above.

In some embodiments, a location of placement of the second content within the bezel area may be determined based on characteristics of the second content at Block 250. Furthermore, a touch input may be received in some cases in a portion of the bezel area, and a hardware function may be executed based on the touch input received at Block 260. For example, a software control panel may be provided in a portion of the bezel area, and the user may be able to provide inputs to the software control panel to execute certain hardware functions, such as raising or lowering the volume, as described above.

In another embodiment, a method for enabling interaction with content items located within a bezel area is shown in FIG. 12 and includes receiving touch input in a bezel area provided on a display at Block 400. A determination may then be made as to whether a force component of the touch input exceeds a predetermined force threshold at Block 410, and user interaction with the content at the location corresponding to the location of the touch input may be enabled in response to a determination that the force component of the touch input exceeds the predetermined force threshold at Block 420.

As described above, in some cases the predetermined force threshold may vary over a duration of the touch input, such as with a dynamic reducing force threshold. Moreover, enabling user interaction with the content at the location corresponding to the location of the touch input may comprise removing a portion of the bezel area corresponding to the location of the touch input. In some cases, a visual indication or a haptic indication of the enablement of user interaction with the content may be provided, as described above.

Furthermore, user interaction with the content at the location corresponding to the location of the touch input may, in some cases, be disabled subsequent to enablement at Block 430. For example, user interaction with the content may be disabled following execution of an operation performed as a result of user interaction with the content. Alternatively or additionally, user interaction with the content may be disabled upon expiration of a predetermined amount of time following enablement of the user interaction. In some cases, the predetermined amount of time may correspond to the force component of the touch input.

In some embodiments, certain ones of the operations above may be modified or further amplified as described below. Furthermore, in some embodiments, additional optional operations may be included, some examples of which are shown in dashed lines in FIGS. 9 and 12. Modifications, additions, or amplifications to the operations above may be performed in any order and in any combination.

In an example embodiment, an apparatus for performing the methods of FIGS. 9 and 12 above may comprise a processor (e.g., the processor 70 of FIG. 2) configured to perform some or each of the operations (200-240 and 400-430) described above. The processor may, for example, be configured to perform the operations (200-240 and 400-430) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 200 may comprise, for example, the communication interface 74, the processor 70, the memory device 76, and/or a device or circuit for executing instructions or executing an algorithm for processing information as described above. Examples of means for performing operations 210 and 250 may comprise, for example, the processor 70, the memory device 76, and/or a device or circuit for executing instructions or executing an algorithm for processing information as described above. Examples of means for performing operations 220, 230, 240, 260, 400, 420, and 430 may comprise, for example, the user interface transceiver 72, the processor 70, the memory device 76, and/or a device or circuit for executing instructions or executing an algorithm for processing information as described above. Examples of means for performing operation 410 may comprise, for example, the processor 70, the memory device 76, sensors, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   cause presentation of content within a bezel area provided on a display;
   receive touch input in the bezel area, wherein user interaction with the content presented within the bezel area at a location corresponding to a location of the touch input is initially disabled;
   determine whether a force component of the touch input received in the bezel area exceeds a predetermined force threshold; and
   enable user interaction with the content presented within the bezel area at the location corresponding to the location of the touch input in response to a determination that the force component of the touch input exceeds the predetermined force threshold.

2. The apparatus of claim 1, wherein the at least one memory and the computer program code are further configured to, with the processor, cause the apparatus to enable user interaction with the content at the location corresponding to the location of the touch input by removing a portion of the bezel area corresponding to the location of the touch input.

3. The apparatus of claim 1, wherein the at least one memory and the computer program code are further configured to, with the processor, cause the apparatus to provide for a visual indication of the enablement of user interaction with the content.

4. The apparatus of claim 1, wherein the at least one memory and the computer program code are further configured to, with the processor, cause the apparatus to provide for a haptic indication of the enablement of user interaction with the content.

5. The apparatus of claim 1, wherein the predetermined force threshold varies over a duration of the touch input.

6. The apparatus of claim 1, wherein the at least one memory and the computer program code are further configured to, with the processor, cause the apparatus to disable user interaction with the content at the location corresponding to the location of the touch input subsequent to enablement following execution of an operation performed as a result of user interaction with the content.

7. The apparatus of claim 1, wherein the at least one memory and the computer program code are further configured to, with the processor, cause the apparatus to disable user interaction with the content at the location corresponding to the location of the touch input upon expiration of a predetermined amount of time following enablement of the user interaction, wherein the predetermined amount of time corresponds to the force component of the touch input.

8. A method comprising:
   causing presentation of content within a bezel area provided on a display;
   receiving touch input in the bezel area, wherein user interaction with the content presented within the bezel area at a location corresponding to a location of the touch input is initially disabled;
   determining whether a force component of the touch input received in the bezel area exceeds a predetermined force threshold; and
   enabling user interaction with the content presented within the bezel area at the location corresponding to the location of the touch input, via a processor, in response to a determination that the force component of the touch input exceeds the predetermined force threshold.

9. The method of claim 8, wherein enabling user interaction with the content at the location corresponding to the location of the touch input comprises removing a portion of the bezel area corresponding to the location of the touch input.

10. The method of claim 8, further comprising providing for a visual indication or a haptic indication of the enablement of user interaction with the content.

11. The method of claim 8, wherein the predetermined force threshold varies over a duration of the touch input.

12. The method of claim 8, further comprising disabling user interaction with the content at the location corresponding to the location of the touch input subsequent to enablement following execution of an operation performed as a result of user interaction with the content.

13. The method of claim 8, further comprising disabling user interaction with the content at the location corresponding to the location of the touch input upon expiration of a predetermined amount of time following enablement of the user interaction, wherein the predetermined amount of time corresponds to the force component of the touch input.

14. A computer program product comprising at least one non-transitory computer-readable storage medium having computer-executable program code portions stored therein, the computer-executable program code portions comprising program code instructions for:
   causing presentation of content within a bezel area provided on a display;
   receiving touch input in the bezel area, wherein user interaction with the content presented within the bezel area at a location corresponding to a location of the touch input is initially disabled;
   determining whether a force component of the touch input received in the bezel area exceeds a predetermined force threshold; and
   enabling user interaction with the content presented within the bezel area at the location corresponding to the location of the touch input in response to a determination that the force component of the touch input exceeds the predetermined force threshold.

15. The computer program product of claim 14, the program code instructions for enabling user interaction with the content at the location corresponding to the location of the touch input are further configured for removing a portion of the bezel area corresponding to the location of the touch input.

16. The computer program product of claim 14, wherein the program code instructions are further configured for providing for a visual indication of the enablement of user interaction with the content.

17. The computer program product of claim 14, wherein the program code instructions are further configured for providing for a haptic indication of the enablement of user interaction with the content.

18. The computer program product of claim 14, wherein the predetermined force threshold varies over a duration of the touch input.

19. The computer program product of claim 14, wherein the program code instructions are further configured for disabling user interaction with the content at the location corresponding to the location of the touch input subsequent to enablement following execution of an operation performed as a result of user interaction with the content.

20. The computer program product of claim 14, wherein the program code instructions are further configured for disabling user interaction with the content at the location corresponding to the location of the touch input upon expiration of a predetermined amount of time following enablement of the user interaction, wherein the predetermined amount of time corresponds to the force component of the touch input.

* * * * *